(12) United States Patent
Schmidt et al.

(10) Patent No.: US 7,437,080 B2
(45) Date of Patent: Oct. 14, 2008

(54) OPTICAL TRANSMISSION SYSTEM HAVING OPTIMIZED FILTER WAVELENGTH OFFSETS

(75) Inventors: Theodore J. Schmidt, Gilroy, CA (US); Anhui H. Liang, Los Gatos, CA (US)

(73) Assignee: Stratalight Communications, Inc., Campbell, CA (US)

( * ) Notice: Subject to any disclaimer, the term of this patent is extended or adjusted under 35 U.S.C. 154(b) by 340 days.

(21) Appl. No.: 11/049,924

(22) Filed: Feb. 3, 2005
(Under 37 CFR 1.47)

(65) Prior Publication Data

US 2006/0171719 A1    Aug. 3, 2006

(51) Int. Cl.
*H04B 10/00*    (2006.01)
(52) U.S. Cl. .................. 398/147; 398/141; 398/158; 398/162
(58) Field of Classification Search .......... 398/140–162
See application file for complete search history.

(56) References Cited

U.S. PATENT DOCUMENTS

| | | | | |
|---|---|---|---|---|
| 5,048,058 A * | 9/1991 | Kaleh | ........................ | 375/274 |
| 5,418,905 A * | 5/1995 | Rarity et al. | .................. | 398/40 |
| 5,504,608 A * | 4/1996 | Neeves et al. | ................ | 398/79 |
| 5,523,874 A * | 6/1996 | Epworth | ..................... | 398/28 |
| 5,552,919 A * | 9/1996 | Majima et al. | .............. | 398/213 |
| 5,751,458 A * | 5/1998 | Yoshida et al. | .............. | 398/185 |
| 6,404,520 B1 | 6/2002 | Robinson et al. | ........... | 359/110 |
| 6,456,759 B1 * | 9/2002 | Pincemin et al. | ............. | 385/27 |
| 6,563,622 B2 * | 5/2003 | Mueller et al. | .............. | 398/182 |
| 6,570,682 B2 | 5/2003 | Robinson et al. | ........... | 359/110 |
| 6,583,903 B1 | 6/2003 | Way et al. | ................... | 359/156 |
| 6,681,081 B2 | 1/2004 | Mao | ........................... | 398/147 |
| 6,694,104 B1 * | 2/2004 | Caplan et al. | .............. | 398/197 |
| 6,850,713 B2 * | 2/2005 | Kikuchi et al. | .............. | 398/201 |
| 7,062,166 B2 * | 6/2006 | Jacobowitz et al. | .......... | 398/32 |
| 7,177,545 B2 * | 2/2007 | Frignac et al. | ................ | 398/85 |
| 7,209,669 B2 * | 4/2007 | Kang et al. | ................. | 398/195 |
| 7,289,698 B2 * | 10/2007 | Deliwala | ..................... | 385/28 |
| 2002/0167703 A1 * | 11/2002 | Merritt | ....................... | 359/173 |
| 2002/0172458 A1 * | 11/2002 | Downie | ....................... | 385/31 |
| 2003/0058509 A1 * | 3/2003 | Webb et al. | ................. | 359/187 |
| 2003/0123884 A1 * | 7/2003 | Willner et al. | ............. | 398/212 |
| 2003/0175036 A1 * | 9/2003 | Mamyshev et al. | ........ | 398/188 |
| 2004/0037569 A1 | 2/2004 | Karnalov et al. | | |
| 2004/0208428 A1 * | 10/2004 | Kikuchi et al. | ................ | 385/24 |
| 2004/0228635 A1 | 11/2004 | Price | | |
| 2005/0084270 A1 * | 4/2005 | Caplan et al. | .............. | 398/141 |
| 2005/0175358 A1 * | 8/2005 | Ilchenko et al. | ............. | 398/198 |
| 2005/0271394 A1 * | 12/2005 | Whiteaway et al. | ........ | 398/188 |

(Continued)

OTHER PUBLICATIONS

Kazushige Yonenaga and Shigeru Kuwano "Dispersion-Tolerant Optical Transmission System Using Duobinary Transmitter and Binary Receiver", Journal Of Lightwave Technology, vol. 15, No. 8, Aug. 1997 pp. 1530-1537.

(Continued)

*Primary Examiner*—Agustin Bello
(74) *Attorney, Agent, or Firm*—Pillsbury Winthrop Shaw Pittman LLP

(57) ABSTRACT

An optical transmission system having optical transmit and receive filters having passbands adjusted or selected for opposite and equal wavelength offsets from the optical wavelength of a carrier or the channel center wavelength.

14 Claims, 12 Drawing Sheets

U.S. PATENT DOCUMENTS

2006/0051095 A1* 3/2006 Essiambre ............... 398/85

OTHER PUBLICATIONS

S. Cao, J. Chen, J. N. Damask, C. R. Doerr, L. Guiziou, G. Harvey, Y. Hibino, H. Li, S. Suzuki, K.-Y. Wu and P. Xie "Interleaver Technology: Comparisons and Applications Requirments", Journal Of Lightwave Technology, vol. 22, No. 1, Jan. 2004, pp. 281-289.

G. P. Agrawal, *Fiber-Optic Communications Systems*, John Wiley & Sons, 1997, p. 172.

S. Cao, J. Chen, J. N. Damask, C. R. Doerr, L. Guiziou, G. Harvey, Y. Hibino, H. Li, S. Suzuki, K.-Y. Wu and P. Xie "Interleaver Technology: Comparisons and Applications Requirements", OFC '03 Interleaver Workshop Review Paper, pp. 1-9.

NEL Data Sheet for model POH220-1, "Athermal AWG Multi/Demodulator", NTT Electronics Group Seibu Industrial Park Naka Ibaraki 311-0122 Japan, Aug. 2001, 2 pages.

NEL Data Sheet for model POH221-2, "AWG Multi/Demodulator", NTT Electronics Group Seibu Industrial Park Naka Ibaraki 311-0122 Japan, Aug. 2001, 2 pages.

NEL Data Sheet for model POH239-2, "Automatic Temperature Controlled AWG Multi/Demodulator", NTT Electronics Group Seibu Industrial Park Naka Ibaraki 311-0122 Japan, Aug. 2001, 1 page.

* cited by examiner

OPTICAL TRANSMISSION SYSTEM HAVING OPTIMIZED FILTER WAVELENGTH OFFSETS

BACKGROUND OF THE INVENTION

1. Field of the Invention

The invention relates generally to optical transmission systems and more particularly to an optical transmission system having transmit and receive filter passband wavelength offsets optimized for best BER performance.

2. Description of the Background Art

Optical communication systems play an important part in modern society's exchange of information. In present metro and long haul optical fiber systems, 2.5 and 10 Gbit/s bit rates with non-return to zero (NRZ), return to zero (RZ) and chirped RZ (CRZ) formats are widely used. Recently, duobinary modulation is being developed to provide narrower optical spectrum and improved tolerance to dispersion. The narrower optical spectrum of duobinary modulation enables systems to have a greater number of channels at closer spacings and carry more data than the above mentioned formats.

Fiber transmission systems, especially wavelength division multiplexing (WDM) and dense wavelength division multiplexing (DWDM) systems use optical filters at the transmit and receive terminals, as well as other locations in the link where traffic is added and dropped, for multiplexing and de-multiplexing. The option for closer spacing of the channels for duobinary modulation requires more precise passband properties for the filters.

Bandwidth limiting occurs when the passbands of the filters are equal to or less than about three times the bandwidth of the signal spectrum. When the bandwidths of the filters are properly chosen this bandwidth limiting can improve the bit error rate (BER) and the related Q performance of a duobinary signal.

Where cost is of no importance, the best BER performance is obtained by having the center of the filter passbands and the center of the signal spectrum at exactly the same wavelength. However practical considerations such as temperature, aging and the difficult of achieving tight tolerances in manufacturing result in wavelength offsets between the centers of the filter passbands and the center of the signal spectrum. These offsets can induce a significant penalty in BER.

Unfortunately, the BER penalty caused by the offsets is accentuated in systems when the filter passbands are narrow enough to take advantage of the BER improvement due to bandwidth limiting. This problem is particularly acute for systems using duobinary modulation because of the capability for narrower channel spacings.

There is a need for a transmission system and method for minimizing the BER penalty caused by filter offsets without the higher costs for tight tolerances for manufacturing, temperature response and aging of the filters and the light source while retaining the BER improvement of optical filter bandwidth limiting.

SUMMARY OF THE INVENTION

Briefly, the present invention is an optical transmission system where transmit and receive channel optical filters have opposite and equal wavelength offsets from the center wavelength of a modulated optical signal or the channel center wavelength for the system.

A first preferred embodiment is an optical transmission system where the receive channel filters are tuned for opposite, equal wavelength offsets to the transmit channel filters with respect to the center wavelengths of the signals in the channels. A second preferred embodiment is an optical transmission system where the transmit channel filters are tuned for opposite, equal wavelength offsets to the receive channel filters with respect to the center wavelengths of the signals in the channels. A third preferred embodiment is an optical transmission system where the light sources are tuned for mid wavelength between center wavelengths of the transmit and receive channel filters. The preferred embodiments may be combined into an embodiment where tuning is applied to two or all three of the receive filters, the transmit filters and the light sources.

A fourth preferred embodiment is an optical transmission system having pre-selected filter sets having transmit and receive channel filters selected for opposite, equal wavelength offsets with respect to channel center wavelengths as designated by a system specification.

The present invention has the benefit of minimizing the BER penalty caused by filter offsets without the higher costs for tight tolerances for manufacturing, temperature response and aging of the filters and the light source while retaining the BER improvement of optical filter bandwidth limiting.

These and other embodiments and benefits of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
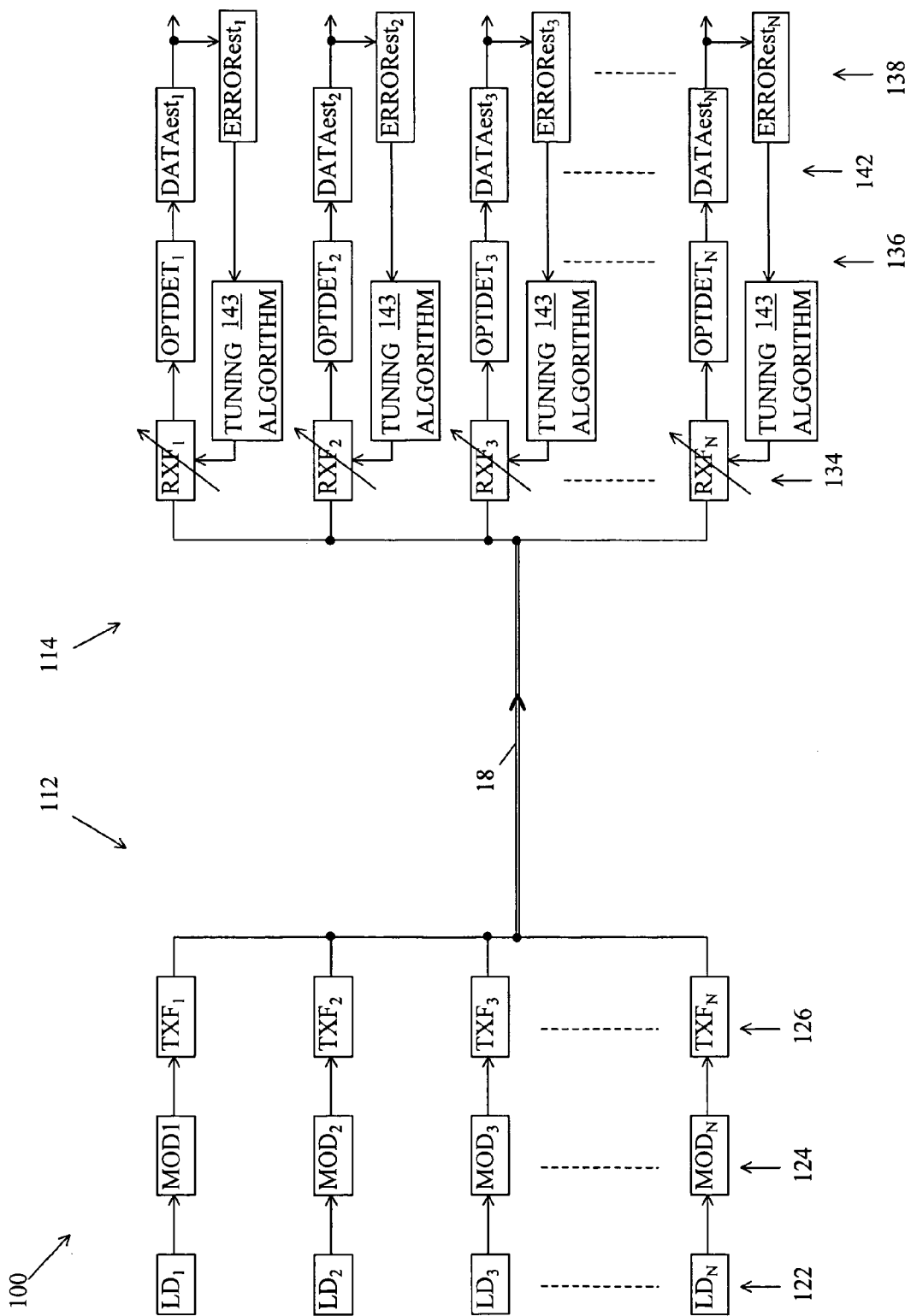
FIG. 1 is a block diagram of a first embodiment of an optical transmission system of the present invention having adjustable receive filters.

FIG. 1 is a block diagram of a first embodiment of an N-channel wavelength division multiplexing (WDM) or dense wavelength division multiplexing (DWDM) transmission system 100 of the present invention. The system 100 includes an N-channel transmitter 112 and an N-channel receiver 114. The transmitter 112 transmits N optical signals of modulated data into N wavelength channels of an optical link 18 where N is any integer from one to one-hundred or even more.

The optical link 18 typically includes fibers, dispersion compensation fibers, optical amplifiers, optical add/drop multiplexers (OADM), reconfigurable optical add/drop multiplexers (ROADM) and the like for carrying an optical signal from the transmitter 112 to the receiver 114. The receiver 114 receives and demodulates the N channels of the modulated optical signal from the link 18 for providing N data channels.

The transmitter 112 includes N light generators including N light devices or sources 122 ($LD_1$, $LD_2$ and $LD_3$ through $LD_N$) and N modulators 124 ($MOD_1$, $MOD_2$ and $MOD_3$ through $MOD_N$); and a multiplexer having N transmit filters 126 ($TXF_1$, $TXF_2$ and $TXF_3$ through $TXF_N$). The transmitter 112 may also include other components such as data coders, booster amplifiers, optical couplers and precompensation.

The light devices 122 generate N carriers nominally having wavelengths defined in the specification for the center wavelengths of the channels of the system 100. The light devices 122 are normally laser diodes such as DBF laser diodes or F-P laser diodes. The modulators 124 modulate data onto the N carriers for providing N modulated optical signals. The modulators 124 may be Mach-Zehnder LiNbO3 or electro-absorption (EA) devices. In an alternative embodiment the functions of the light devices 122 and the modulators 124 for each channel can be combined into directly modulated light device or sources 122/124 for providing the N modulated optical signals.

The transmit filters 126 filter the modulated optical signals and multiplex the N filtered signals into the optical link 18. The transmit filters 126 may be implemented as N separate devices or as a single device having multiple passbands. They may be constructed with interleavers, arrayed wavelength grating (AWG), fiber Bragg grating (FBG), thin-film filter (TFF) devices or other optical filter devices.

The receiver 114 includes a demultiplexer using N adjustable receive filters 134 ($RXF_1$, $RXF_2$ and $RXF_3$ through $RXF_N$), N optical detectors 136 ($OPTDET_1$, $OPTDET_2$ and $OPTDET_3$ through $OPTDET_N$), N error estimators 138 ($ERRORest_1$, $ERRORest_2$ and $ERRORest_3$ through $ERRORest_N$), N data estimators 142 ($DATAest_1$, $DATAest_2$ and $DATAest_3$ through $DATAest_N$), and a tuning algorithm 143. The receiver 114 may also include other components such as preamplifiers, post compensation, optical couplers, trans-impedance amplifiers, limiting amplifiers and radio frequency (RF) filters.

The N receive filters 134 filter the incoming optical signal into N channels from the optical link 18 and pass N channel filtered signals to the optical detectors 136. The receive filters 134 may be implemented as N separate devices or as a single device having multiple passbands. They may be constructed with interleavers, arrayed wavelength grating (AWG), fiber Bragg grating (FBG), thin-film filter (TFF) devices or other optical filtering devices.

The optical detectors 136 convert the N modulated optical signals into N electrical signals and pass the modulated electrical signals to the error estimators 138 and the data estimators 142. The optical detectors 136 may be photodiodes or avalanche photodiodes. The data estimators 142 may include clock and carrier recovery circuits, demodulators, data recovery circuits, and forward error correction (FEC) for providing their best estimates of the data that was transmitted in each of the N channels.

The error estimators 138 monitor the modulated electrical signals from the optical detectors 136 for providing N raw bit error rates (BERs) based on error counts before forward error correction. The N raw BERs are used for generating feedback signals for tuning the center wavelengths of the N receive filters 134 according to the tuning algorithm 143. The pass-bands of the receive filters 134 may be tuned with temperature controlled ovens or other means to provide an optimized center wavelengths for best system performance.

Figure 2:
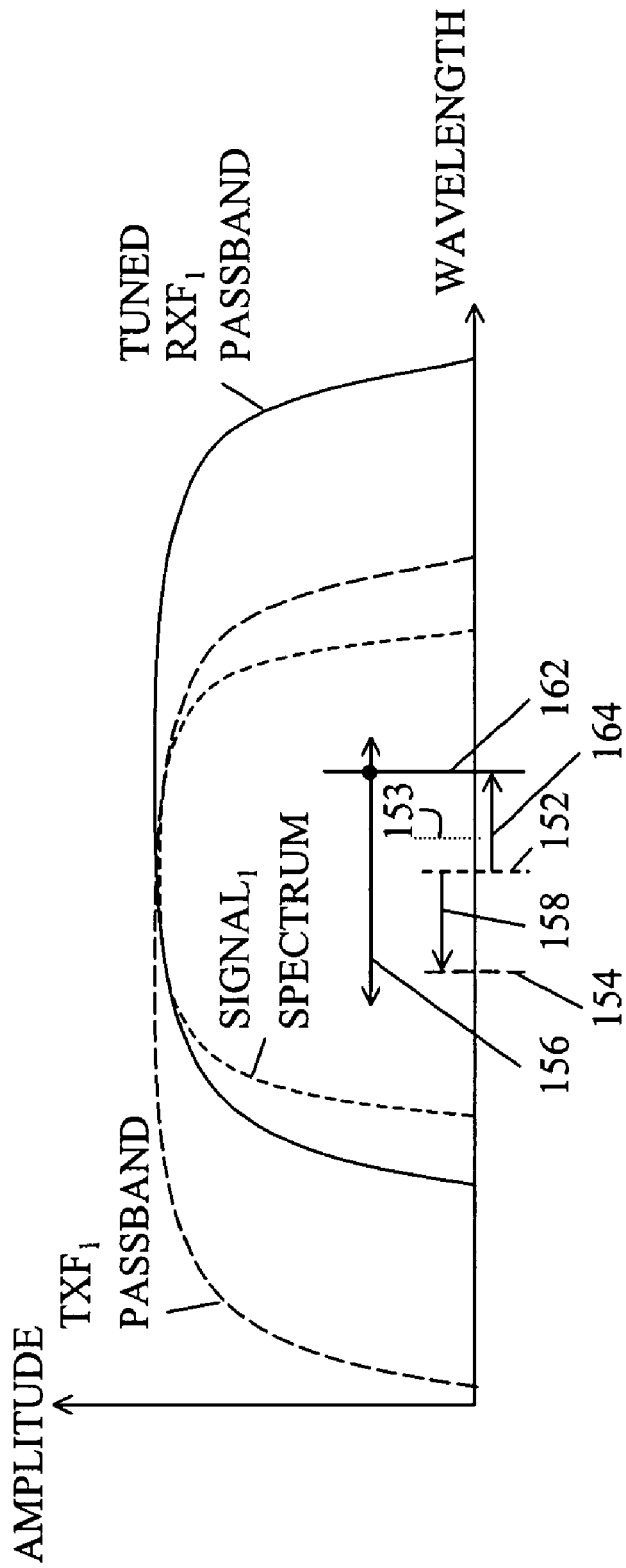
FIG. 2 is a wavelength chart for the system of FIG. 1.

FIG. 2 is an amplitude versus wavelength chart for the system 100 illustrating the way in which the wavelength passbands of the receive filters 134 are controlled by the error feedback signal from the error estimators 138 and the tuning algorithm 143. The first wavelength channel of the N-channel system 100 is arbitrarily selected as an example. The receive filters 134 for all N wavelength channels operate in a similar fashion. Wavelength passbands for the transmit filter $TXF_1$ and the receiver filter $RXF_1$ are shown superimposed with the wavelength spectrum of a corresponding exemplary first modulated optical signal ($SIGNAL_1$) in a first wavelength channel for the system 100.

The spectrum of the pre-filtered modulated $SIGNAL_1$ has a carrier wavelength 152 provided by the light device $LD_1$ or $LD_1/MOD_1$. The amplitude of the carrier may or may not be suppresse by the modulation. The carrier wavelength 152 and the center of the $SIGNAL_1$ are considered to be equivalent. The passband of the transmit filter $TXF_1$ has a center wavelength 154. The passband of the adjustable receive filter $RXF_1$ has a tuning range 156 having a nominal design center wavelength.

The carrier wavelength 152, transmit filter center wavelength 154 and the receive filter nominal center wavelength are designed and manufactured to match the specified center wavelength 153 of the first channel of the system 100. However, manufacturing tolerances and drift over time and temperature result in unintentional wavelength errors or offsets with respect to the specified center wavelength 153 and with respect to each other.

The transmit filter center wavelength 154 has an unintended transmit filter offset 158 with respect to the carrier wavelength 152. After it is tuned within the present invention, the passband of the receive filter $RXF_1$ has a center wavelength 162 having a receive filter offset 164 with respect to the carrier wavelength 152. The transmit and receive wavelength 158 and 164 offsets have a major impact on the bit BER performance of the estimated data that is determined by the data estimator $DATAest_1$. The raw BER feedback signal from the error estimator $ERRORest_1$ tunes the center wavelength 162 of the receive filter $RXF_1$ according to the tuning algorithm 143 for a minimum raw BER.

The tuning algorithm 143 is designed so that the receive center wavelength 162 is tuned to the opposite side of the carrier wavelength 152 as the transmit center wavelength 154 SO that the receive filter offset 164 is equal to the transmit filter offset 158 but has the opposite sign with respect to the carrier wavelength 152. This has the rather unexpected result that the minimum BER is obtained by separating the center wavelengths 154 and 162 of the transmit and receive filters $TXF_1$ and $RXF_1$ and placing the center wavelengths 154 and 162 at equal wavelength differences on opposite sides of the carrier wavelength 152.

Figure 3:
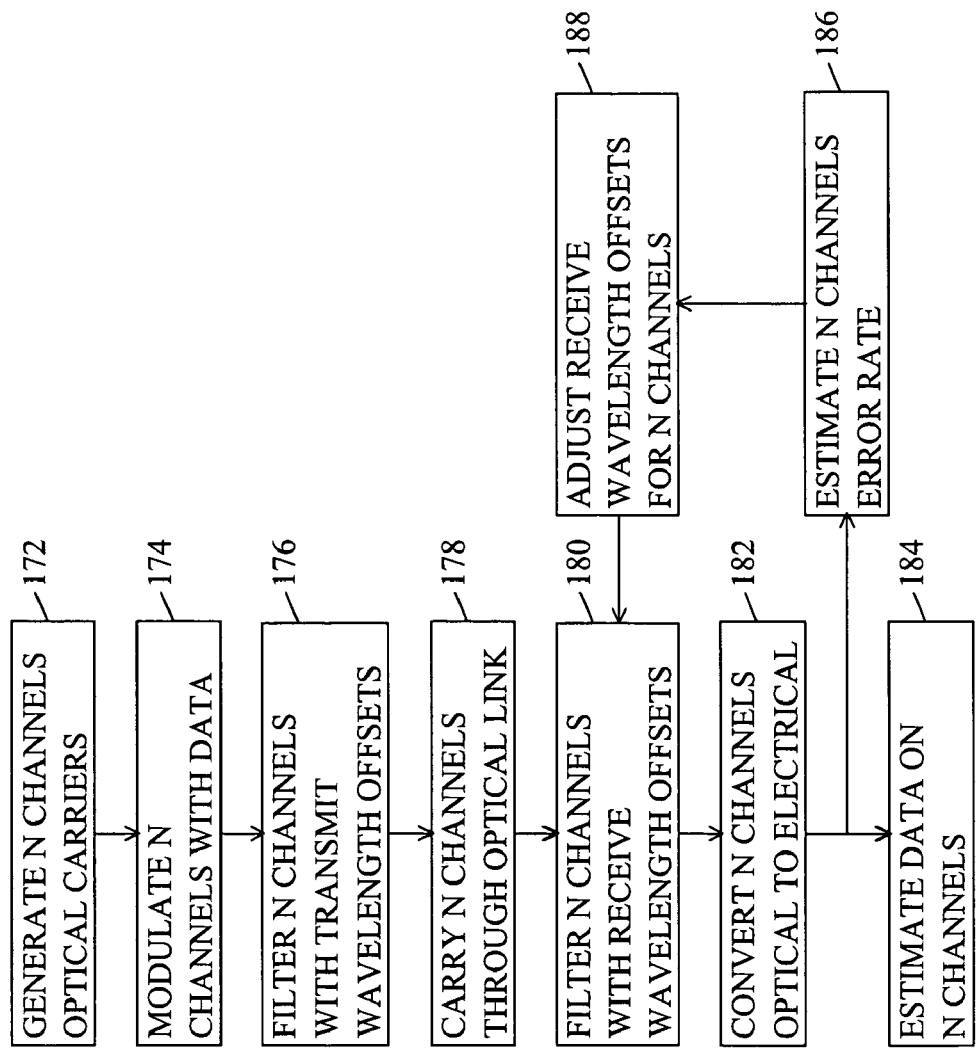
FIG. 3 is a flow chart of a method for the optical transmission system of FIG. 1.

FIG. 3 is a flow chart of the first embodiment of a method of the present invention for transmitting N-channel wavelength division multiplexing (WDM) or dense wavelength division multiplexing (DWDM) optical signals. In steps 172 and 174, N optical signals are generated and modulated with data at a transmitter. In a step 176 the N channels are filtered with transmit filters having N transmit filter wavelength offsets with respect to the carriers of the N optical signals and multiplexed onto an optical link.

The N channel optical signal is carried by the optical link in a step 178 from the transmitter to a receiver. In a step 180 the N channels are demultiplexed and filtered with receive filters having adjustable center wavelengths. In a step 182 the N optical signals are converted to N electrical signals. In a step 184 the data on the N electrical signals is estimated. In a step 186 either as a result of the estimation of the data in the step 184 or as a separate operation, an error rate is estimated. Then in a step 188 the N data error estimates are used to tune the center wavelengths of the N receive filters in the opposite direction to the transmit filter wavelength offsets in order to minimize the estimated error rates.

Figure 4:
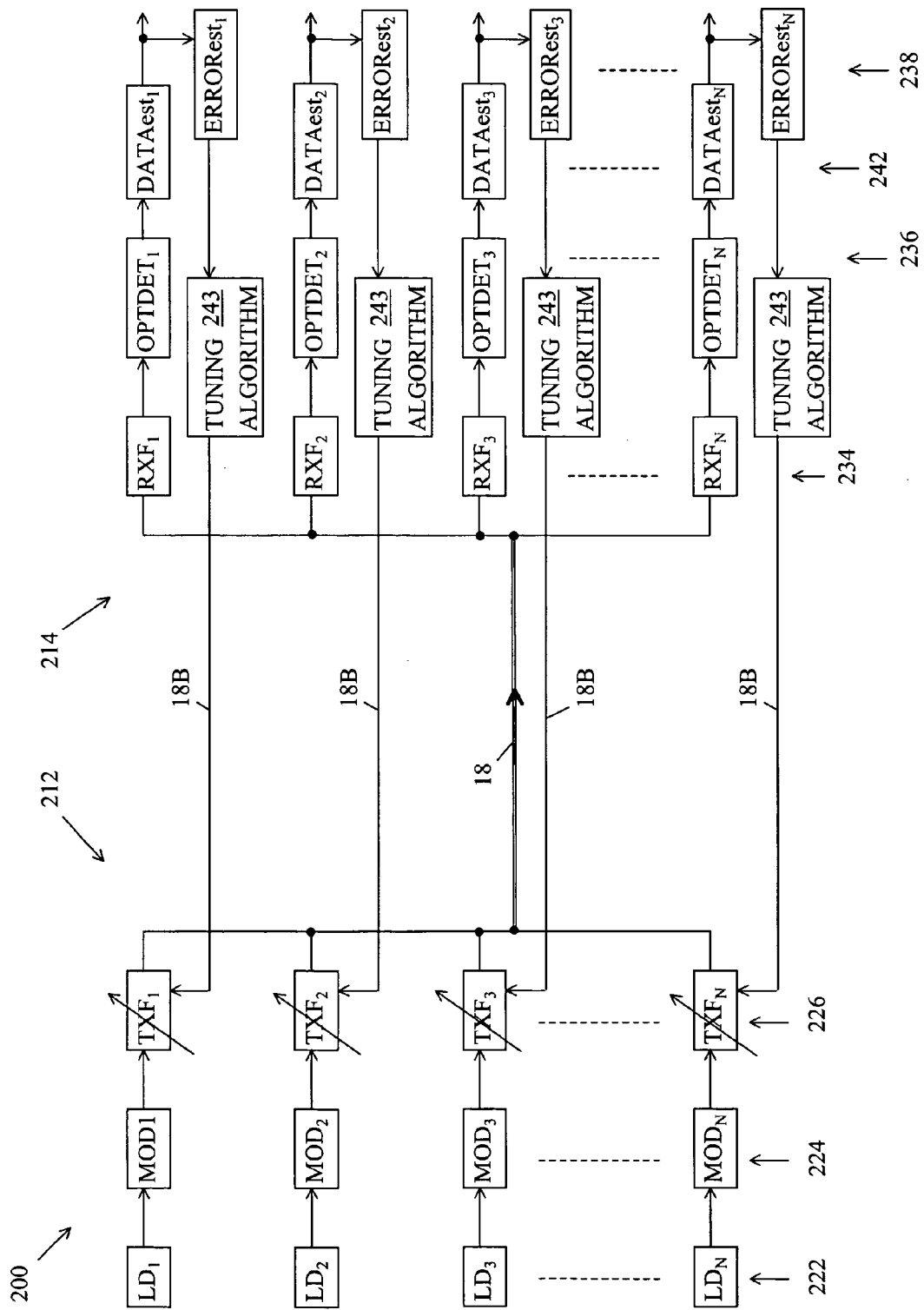
FIG. 4 is a block diagram of a second embodiment of an optical transmission system of the present invention having adjustable transmit filters.

FIG. 4 is a block diagram of a second embodiment of an N-channel wavelength division multiplexing (WDM) or dense wavelength division multiplexing (DWDM) transmission system 200 of the present invention. The system 200 includes an N-channel transmitter 212 and an N-channel receiver 214. The transmitter 212 transmits N optical signals of modulated data into N wavelength channels of an optical link 18 where N is any integer from one to one-hundred or even more.

The optical link 18 typically includes fibers, dispersion compensation fibers, optical amplifiers, optical add/drop multiplexers (OADM), reconfigurable optical add/drop multiplexers (ROADM) and the like for carrying an optical signal from the transmitter 212 to the receiver 214. The receiver 214 receives and demodulates the N channels of the modulated optical signal from the link 18 for providing N data channels.

The transmitter 212 includes N light generators including N light devices or sources 222 ($LD_1$, $LD_2$ and $LD_3$ through $LD_N$) and N modulators 224 ($MOD_1$, $MOD_2$ and $MOD_3$ through $MOD_N$); and a multiplexer having N adjustable transmit filters 226 ($TXF_1$, $TXF_2$ and $TXF_3$ through $TXF_N$). The transmitter 212 may also include other components such as data coders, booster amplifiers, optical couplers and precompensation.

The light devices 222 generate N carriers nominally having wavelengths defined in the specification for the center wavelengths of the channels of the system 200. The light devices 222 are normally laser diodes such as DBF laser diodes or F-P laser diodes. The modulators 224 modulate data onto the N carriers for providing N modulated optical signals. The modulators 224 may be Mach-Zehnder LiNbO3 or electro-absorption (EA) devices. In an alternative embodiment the functions of the light devices 222 and the modulators 224 for each channel can be combined into directly modulated light devices or sources 222/224 for providing the N modulated optical signals.

The transmit filters 226 filter the modulated optical signals and multiplex the N filtered signals into the optical link 18. The transmit filters 226 may be implemented as N separate devices or as a single device having multiple passbands. They may be constructed with interleavers, arrayed wavelength grating (AWG), fiber Bragg grating (FBG), thin-film filter (TFF) devices or other optical filter devices.

The receiver 214 includes a demultiplexer using N receive filters 234 ($RXF_1$, $RXF_2$ and $RXF_3$ through $RXF_N$), N optical detectors 236 ($OPTDET_1$, $OPTDET_2$ and $OPTDET_3$ through $OPTDET_N$), N error estimators 238 ($ERRORest_1$, $ERRORest_2$ and $ERRORest_3$ through $ERRORest_N$), N data estimators 242 ($DATAest_1$, $DATAest_2$ and $DATAest_3$ through $DATAest_N$), and a tuning algorithm 243. The receiver 214 may also include other components such as preamplifiers, post compensation, optical couplers, trans-impedance amplifiers, limiting amplifiers and radio frequency (RF) filters.

The N receive filters 234 filter the incoming optical signal into N channels from the optical link 18 and pass N channel filtered signals to the optical detectors 236. The receive filters 234 may be implemented as N separate devices or as a single device having multiple passbands. They may be constructed with interleavers, arrayed wavelength grating (AWG), fiber Bragg grating (FBG), thin-film filter (TFF) devices or other optical filtering devices.

The optical detectors 236 convert the N modulated optical signals into N electrical signals and pass the modulated electrical signals to the error estimators 238 and the data estimators 242. The optical detectors 236 may be photodiodes or avalanche photodiodes. The data estimators 242 may include clock and carrier recovery circuits, demodulators, data recovery circuits, and forward error correction (FEC) for providing their best estimates of the data that was transmitted in each of the N channels. The error estimators 238 monitor the modulated electrical signals from the optical detectors 236 for providing N raw bit error rates (BERS) based on error counts before forward error correction.

The feedback signals from the N raw BERs are carried on a back link 18B to the receiver 214. The back link 18B is preferably an optical link having fibers, dispersion compensation fibers, optical amplifiers, optical add/drop multiplexers (OADM), reconfigurable optical add/drop multiplexers (ROADM) and the like for carrying an optical signal from the receiver 214 back to the transmitter 212. Alternatively, the back link 18B use a wireless radio frequency communication link or a wired connection.

The transmitter 212 receives the back link signal and uses the N raw BERs for tuning the N transmit filters 226 according to the tuning algorithm 243. The passbands of the transmit filters 226 may be tuned with temperature controlled ovens or other means to provide an optimized center wavelengths for best system performance.

Figure 5:
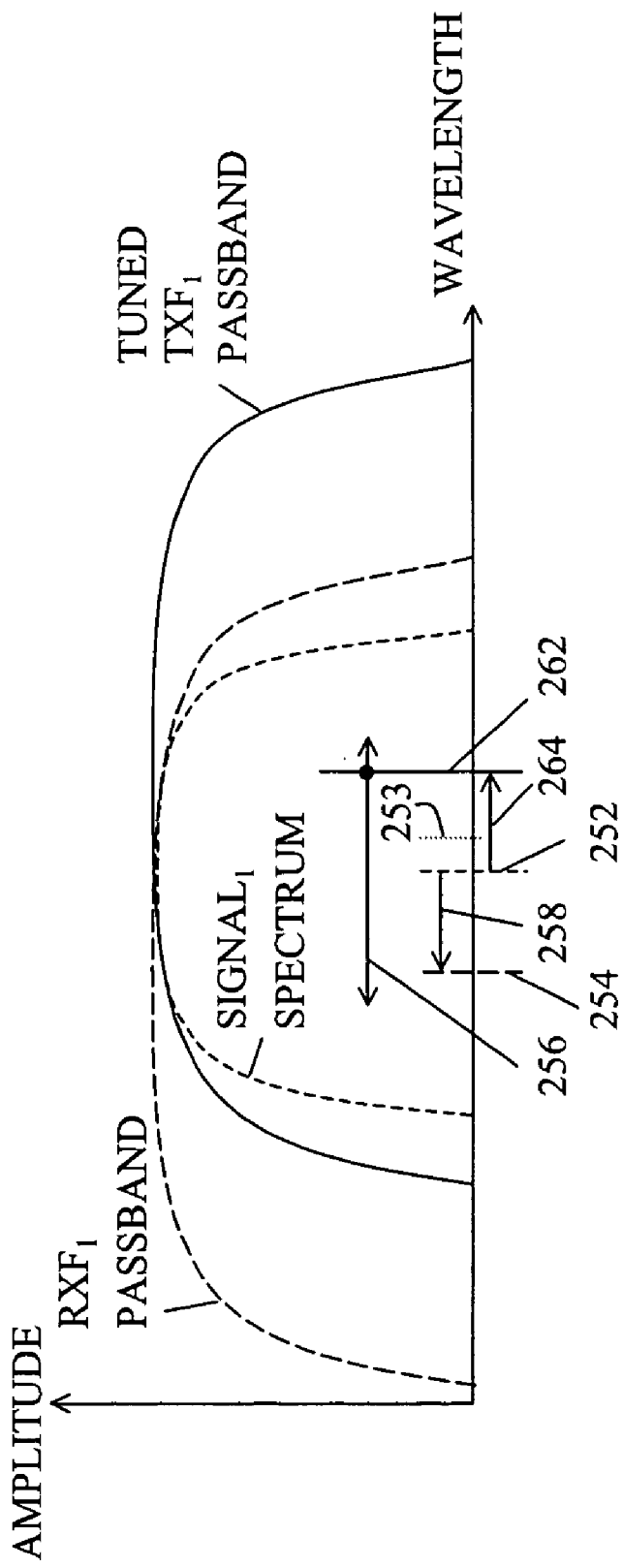
FIG. 5 is a wavelength chart for the system of FIG. 4.

FIG. 5 is an amplitude versus wavelength chart for the system 200 illustrating the way in which the wavelength passbands of the transmit filters 226 are controlled by the error feedback signal from the error estimators 238 and the tuning algorithm 243. The first wavelength channel of the N-channel system 200 is arbitrarily selected as an example. The transmit filters 226 for all N wavelength channels operate in a similar fashion. Wavelength passbands for the transmit filter $TXF_1$ and the receiver filter $RXF_1$ are shown superimposed with the wavelength spectrum of a corresponding exemplary first modulated optical signal ($SIGNAL_1$) in a first wavelength channel for the system 200.

The spectrum of the pre-filtered modulated $SIGNAL_1$ has a carrier wavelength 252 provided by the light device $LD_1$ or $LD_1/MOD_1$. The amplitude of the carrier may or may not be suppressed by the modulation. The carrier wavelength 252 and the center of the $SIGNAL_1$ are considered to be equivalent. The passband of the receive filter $RXF_1$ has a center wavelength 254. The passband of the adjustable transmit filter $TXF_1$ has a tuning range 256 about a nominal design center wavelength.

The carrier wavelength 252, receive filter center wavelength 254 and the transmit filter nominal center wavelength are designed and manufactured to match the specified center wavelength 253 of the first channel of the system 200. However, manufacturing tolerances and drift over time and temperature result in unintentional wavelength errors or offsets with respect to the specified center wavelength 253 and with respect to each other.

The receive filter center wavelength 254 has an unintended receive filter offset 258 with respect to the carrier wavelength 252. After it is tuned within the present invention, the passband of the transmit filter $TXF_1$ has a center wavelength 262 having a transmit filter offset 264 with respect to the carrier wavelength 252. The receive and transmit wavelength offsets 258 and 264 have a major impact on the bit BER performance of the estimated data that is determined by the data estimator DATAest$_1$. The raw BER feedback signal from the error estimator ERRORest$_1$ tunes the center wavelength 262 of the transmit filter TXF$_1$ according to the tuning algorithm 243 for a minimum raw BER.

The tuning algorithm 243 is designed so that the transmit center wavelength 262 is tuned to the opposite side of the carrier wavelength 252 as the receive center wavelength 254 so that the transmit filter offset 264 is equal to the receive filter offset 258 but has the opposite sign with respect to the carrier wavelength 252. This has the rather unexpected result that the minimum BER is obtained by separating the center wavelengths 254 and 262 of the receive and transmit filters RXF$_1$ and TXF$_1$ and placing the center wavelengths 254 and 262 at equal wavelength differences on opposite sides of the carrier wavelength 252.

Figure 6:
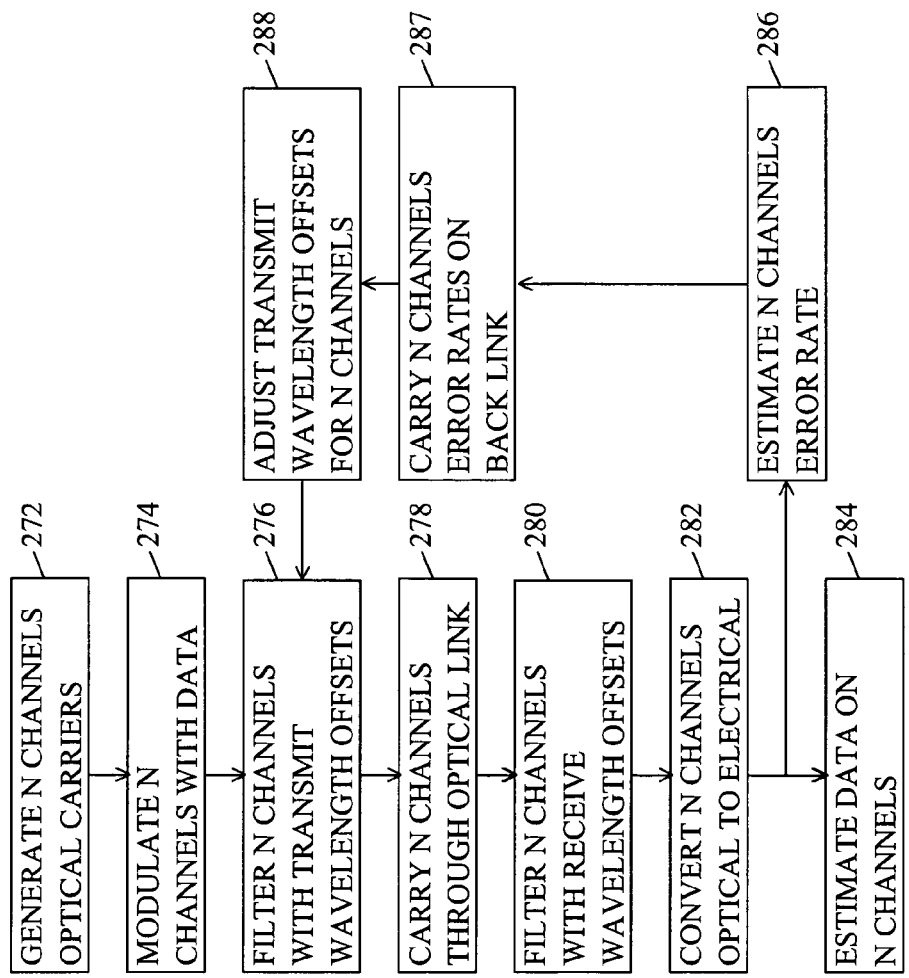
FIG. 6 is a flow chart of a method for the optical transmission system of FIG. 4.

FIG. 6 is a flow chart of the second embodiment of a method of the present invention for transmitting N-channel wavelength division multiplexing (WDM) or dense wavelength division multiplexing (DWDM) optical signals. In steps 272 and 274, N optical signals are generated and modulated with data at a transmitter. In a step 276 the N channels are filtered with transmit filters having adjustable center wavelengths and multiplexed onto an optical link.

The N channel optical signal is carried by the optical link in a step 278 from the transmitter to a receiver. In a step 280 the N channels are demultiplexed and filtered with receive filters having N receive filter wavelength offsets with respect to the carriers of the N optical signals. In a step 282 the N optical signals are converted to N electrical signals. In a step 284 the data on the N electrical signals is estimated. In a step 286 either as a result of the estimation of the data in the step 284 or as a separate operation, an error rate is estimated. In a step 287 the N error rates are passed back to the transmitter. Then in a step 288 the N data error estimates are used to tune the center wavelengths of the N transmit filters in the opposite direction to the receive filter wavelength offsets in order is to minimize the estimated error rates.

Figure 7:
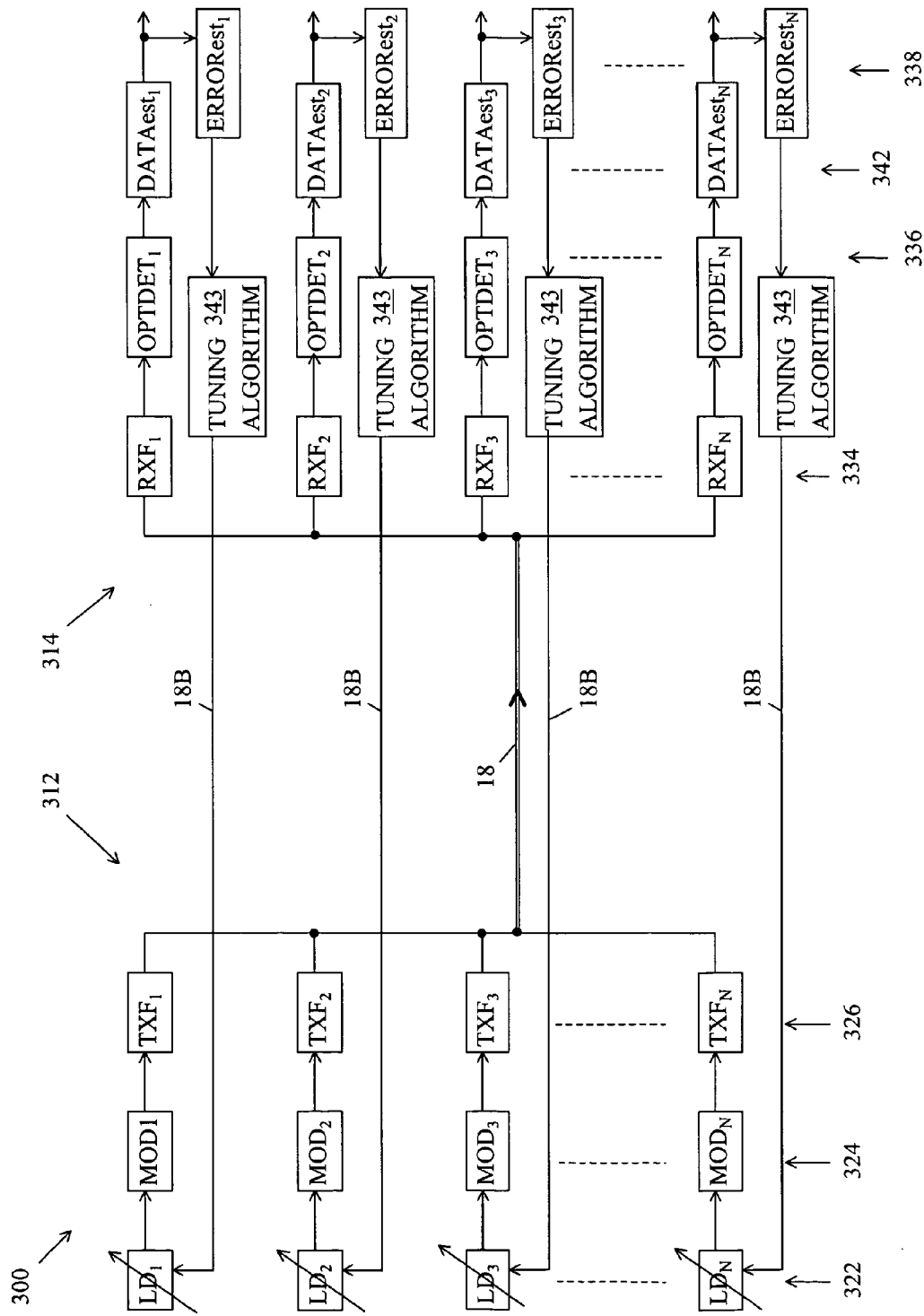
FIG. 7 is a block diagram of a third embodiment of an optical transmission system of the present invention having adjustable light device.

FIG. 7 is a block diagram of a third embodiment of an N-channel wavelength division multiplexing (WDM) or dense wavelength division multiplexing (DWDM) transmission system 300 of the present invention. The system 300 includes an N-channel transmitter 312 and an N-channel receiver 314. The transmitter 312 transmits N optical signals of modulated data into N wavelength channels of an optical link 18 where N is any integer from one to one-hundred or even more.

The optical link 18 typically includes fibers, dispersion compensation fibers, optical amplifiers, optical add/drop multiplexers (OADM), reconfigurable optical add/drop multiplexers (ROADM) and the like for carrying an optical signal from the transmitter 312 to the receiver 314. The receiver 314 receives and demodulates the N channels of the modulated optical signal from the link 18 for providing N data channels.

The transmitter 312 includes N light generators including wavelength tunable N light devices or sources 322 (LD$_1$, LD$_2$ and LD$_3$ through LD$_N$) and N modulators 324 (MOD$_1$, MOD$_2$ and MOD$_3$ through MOD$_N$); and a multiplexer having N transmit filters 326 (TXF$_1$, TXF$_2$ and TXF$_3$ through TXF$_N$). The transmitter 312 may also include other components such as data coders, booster amplifiers, optical couplers and pre-compensation.

The tunable light devices 322 generate N carriers nominally having wavelengths defined in the specification for the center wavelengths of the channels of the system 300. The light devices 322 are normally laser diodes such as DBF laser diodes or F-P laser diodes. The modulators 324 modulate data onto the N carriers for providing N modulated optical signals.

The modulators 324 may be Mach-Zehnder LiNbO3 or electro-absorption (EA) devices. In an alternative embodiment the functions of the light devices 322 and the modulators 324 for each channel can be combined into directly modulated light devices or sources 322/324 for providing the N modulated optical signals.

The transmit filters 326 filter the modulated optical signals and multiplex the N filtered signals into the optical link 18. The transmit filters 326 may be implemented as N separate devices or as a single device having multiple passbands. They may be constructed with interleavers, arrayed wavelength grating (AWG), fiber Bragg grating (FBG), thin-film filter (TFF) devices or other optical filter devices.

The receiver 314 includes a demultiplexer using N receive filters 334 (RXF$_1$, RXF$_2$ and RXF$_3$ through RXF$_N$), N optical detectors 336 (OPTDET$_1$, OPTDET$_2$ and OPTDET$_3$ through OPTDET$_N$), N error estimators 338 (ERRORest$_1$, ERRORest$_2$ and ERRORest$_3$ through ERRORest$_N$), N data estimators 342 (DATAest$_1$, DATAest$_2$ and DATAest$_3$ through DATAest$_N$), and a tuning algorithm 343. The receiver 314 may also include other components such as preamplifiers, post compensation, optical couplers, trans-impedance amplifiers, limiting amplifiers and radio frequency (RF) filters.

The N receive filters 334 filter the incoming optical signal into N channels from the optical link 18 and pass N channel filtered signals to the optical detectors 336. The receive filters 334 may be implemented as N separate devices or as a single device having multiple passbands. They may be constructed with interleavers, arrayed wavelength grating (AWG), fiber Bragg grating (FBG), thin-film filter (TFF) devices or other optical filtering devices.

The optical detectors 336 convert the N modulated optical signals into N electrical signals and pass the modulated electrical signals to the error estimators 338 and the data estimators 342. The optical detectors 336 may be photodiodes or avalanche photodiodes. The data estimators 342 may include clock and carrier recovery circuits, demodulators, data recovery circuits, and forward error correction (FEC) for providing their best estimates of the data that was transmitted in each of the N channels. The error estimators 338 monitor the modulated electrical signals from the optical detectors 336 for providing N raw bit error rates (BERs) based on error counts before forward error correction.

The feedback signals from the N raw BERs are carried on a back link 18B to the receiver 314. The back link 18B is preferably an optical link having fibers, dispersion compensation fibers, optical amplifiers, optical add/drop multiplexers (OADM), reconfigurable optical add/drop multiplexers (ROADM) and the like for carrying an optical signal from the receiver 314 back to the transmitter 312. Alternatively, the back link 18B may be a wireless radio frequency communication link or a wired connection.

The transmitter 312 receives the back link signal and uses the N raw BERs for tuning the N light devices 322 according to the tuning algorithm 343. The wavelengths of the light devices 322 may be tuned by controlling the temperatures of the light devices 322 or by controlling the lengths of the cavities of the light devices 322, or by other adjustment means for optimizing carrier wavelengths for best system performance.

Figure 8:
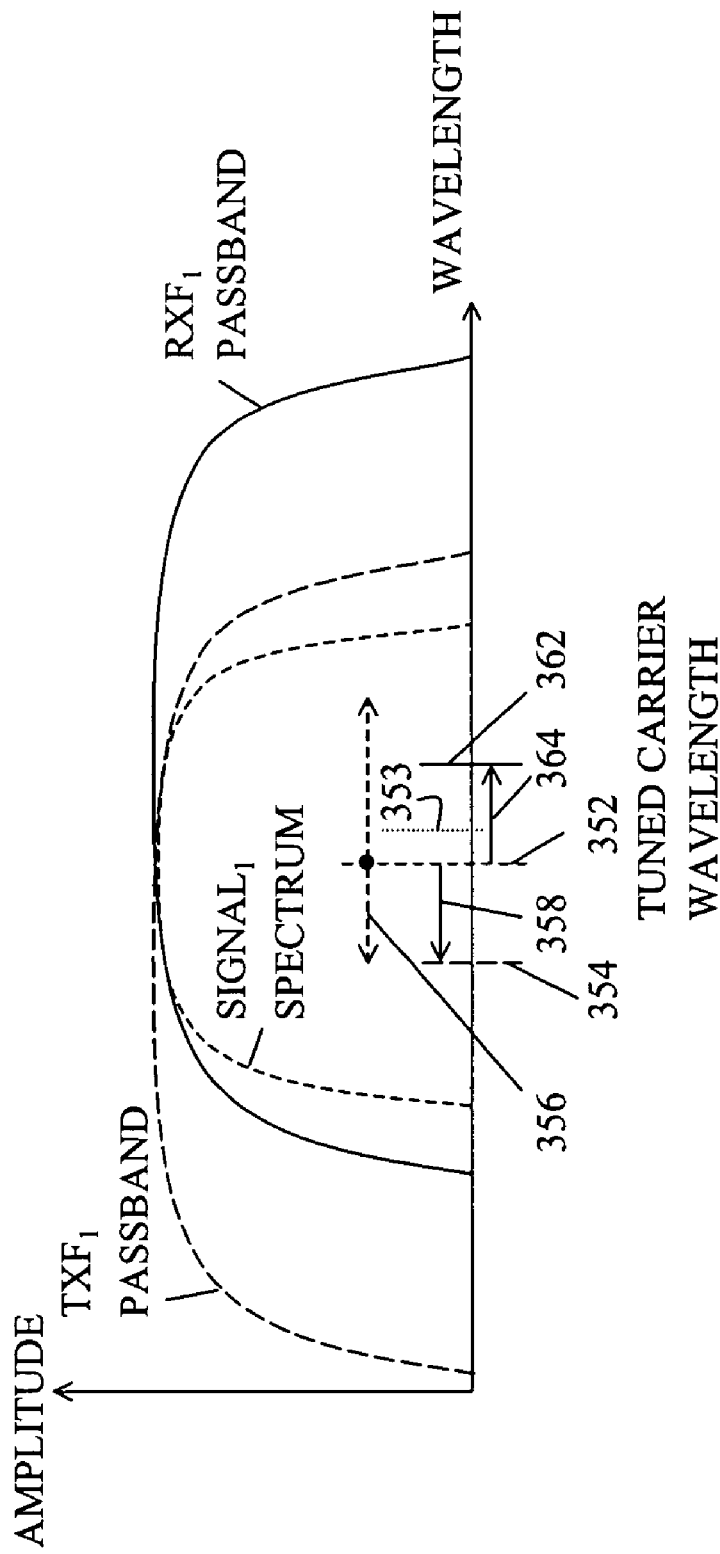
FIG. 8 is a wavelength chart for the system of FIG. 7.

FIG. 8 is an amplitude versus wavelength chart for the system 300 illustrating the way in which the wavelengths of the carriers of the light devices 322 are controlled by the error feedback signal from the error estimators 338 and the tuning algorithm 343. The first wavelength channel of the N-channel system 300 is arbitrarily selected as an example. The light devices 322 for all N wavelength channels operate in a similar fashion. Wavelength passbands for the transmit filter $TXF_1$ and the receiver filter $RXF_1$ are shown superimposed with the wavelength spectrum of a corresponding exemplary first modulated optical signal ($SIGNAL_1$) in a first wavelength channel for the system 300 after the carrier wavelength has been tuned.

The passband of the transmit filter $TXF_1$ has a center wavelength 354. The passband of the receive filter $RXF_1$ has a center wavelength 362. The spectrum of the pre-filtered modulated $SIGNAL_1$ has a carrier wavelength provided by the light device $LD_1$ or $LD_1/MOD_1$ having a tuning range 356. The amplitude of the carrier may or may not be suppressed by the modulation. The nominal carrier wavelength of the light device 322, the transmit filter center wavelength 354 and the receive filter center wavelength 362 are designed and manufactured to match the specified center wavelength 353 of the first channel of the system 300. However, manufacturing tolerances and drift over time and temperature result in unintentional wavelength errors or offsets with respect to the specified center wavelength 353 and with respect to each other.

The raw BER feedback signal from the error estimator $ERRORest_1$ tunes the carrier of the light device $LD_1$ or $LD_1/MOD_1$ to a carrier wavelength 352 for a minimum raw BER according to the tuning algorithm 343. The tuning algorithm 343 is designed so that the carrier wavelength 352 splits the difference between the receive filter center wavelength 354 and transmit filter center wavelength 362 so that a transmit filter offset 358 is equal to a receive filter offset 364 but has the opposite sign with respect to the carrier wavelength 352. The transmit and receive wavelength offsets 358 and 364 have a major impact on the bit BER performance of the estimated data that is determined by the data estimator $DATAest_1$. The tuning algorithm 343 provides the unexpected result that the minimum BER is obtained by placing the center wavelengths 354 and 362 at equal wavelength differences on opposite sides of the carrier wavelength 352.

Figure 9:
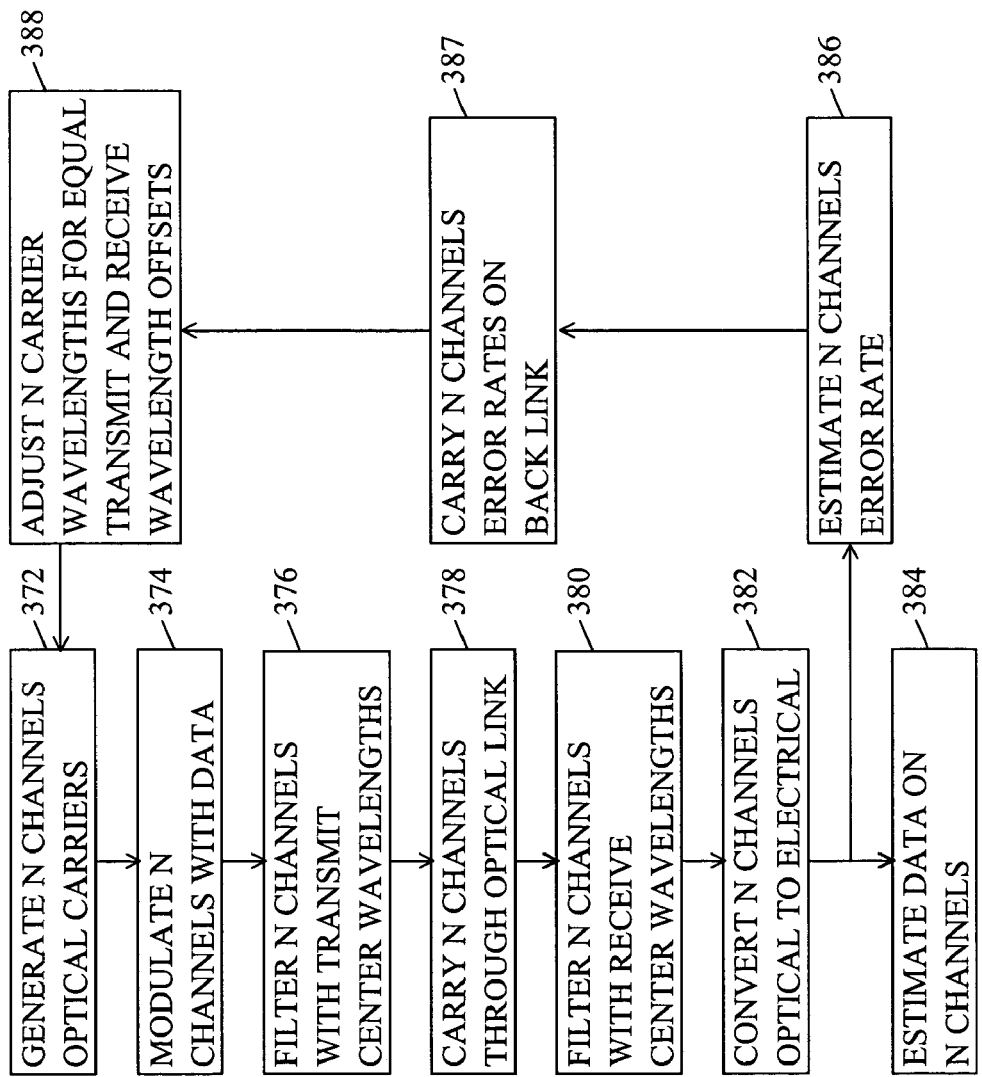
FIG. 9 is a flow chart of a method for the optical transmission system of FIG. 7.

FIG. 9 is a flow chart of the third embodiment of a method of the present invention for transmitting N-channel wavelength division multiplexing (WDM) or dense wavelength division multiplexing (DWDM) optical signals. In steps 372 and 374, N optical signals are generated by light sources and modulated with data at a transmitter. In a step 376 the N channels are filtered with transmit filters having N transmit center wavelengths onto an optical link.

The N channel optical signal is carried by the optical link in a step 378 from the transmitter to a receiver. In a step 380 the N channels are demultiplexed and filtered with receive filters having N receive center wavelengths. In a step 382 the N optical signals are converted to N electrical signals. In a step 384 the data on the N electrical signals is estimated. In a step 386 either as a result of the estimation of the data in the step 384 or as a separate operation, an error rate is estimated. In a step 387 the N error rates are passed back to the transmitter. Then in a step 388 the N data error estimates are used to tune the N carrier wavelengths of the N light sources to split the difference between the transmit and receive filter center wavelengths in order to minimize the estimated error rates.

Figure 10:
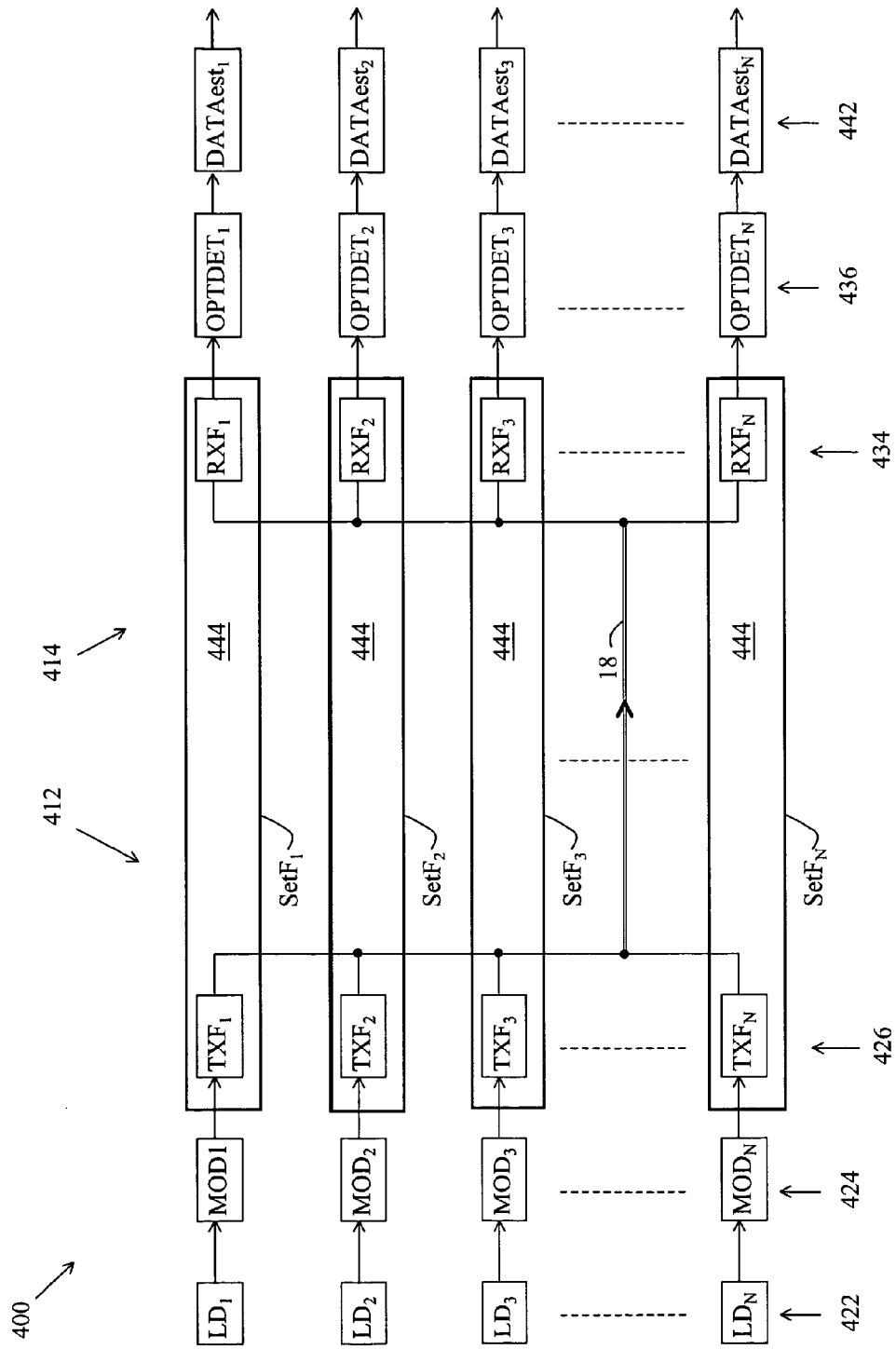
FIG. 10 is a block diagram of a fourth embodiment of an optical transmission system of the present invention having selected filter sets.

FIG. 10 is a block diagram of a fourth embodiment of an N-channel wavelength division multiplexing (WDM) or dense wavelength division multiplexing (DWDM) transmission system 400 of the present invention. The system 400 includes an N-channel transmitter 412 and an N-channel receiver 414. The transmitter 412 transmits N optical signals of modulated data into N wavelength channels of an optical link 18 where N is any integer from one to one-hundred or even more.

The optical link 18 typically includes fibers, dispersion compensation fibers, optical amplifiers, optical add/drop multiplexers (OADM), reconfigurable optical add/drop multiplexers (ROADM) and the like for carrying an optical signal from the transmitter 412 to the receiver 414. The receiver 414 receives and demodulates the N channels of the modulated optical signal from the link 18 for providing N channels of estimated data.

The transmitter 412 includes N light generators including N light devices or sources 422 ($LD_1$, $LD_2$ and $LD_3$ through $LD_N$) and N modulators 424 ($MOD_1$, $MOD_2$ and $MOD_3$ through $MOD_N$); and a multiplexer having N transmit filters 426 ($TXF_1$, $TXF_2$ and $TXF_3$ through $TXF_N$). The transmitter 412 may also include other components such as data coders, booster amplifiers, optical couplers and precompensation.

The light devices 422 generate N carriers nominally having wavelengths defined in the specification for the center wavelengths of the channels of the system 400. The light devices 422 are normally laser diodes such as DBF laser diodes or F-P laser diodes. The modulators 424 modulate data onto the N carriers for providing N modulated optical signals. The modulators 424 may be Mach-Zehnder LiNbO3 or electro-absorption (EA) devices. In an alternative embodiment the functions of the light devices 422 and the modulators 424 for each channel can be combined into directly modulated light device or sources 422/424 for providing the N modulated optical signals.

The transmit filters 426 filter the modulated optical signals and multiplex the N filtered signals into the optical link 18. The transmit filters 426 may be implemented as N separate devices or as a single device having multiple passbands. They may be constructed with interleavers, arrayed wavelength grating (AWG), fiber Bragg grating (FBG), thin-film filter (TFF) devices or other optical filter devices.

The receiver 414 includes a demultiplexer using N receive filters 434 ($RXF_1$, $RXF_2$ and $RXF_3$ through $RXF_N$), N optical detectors 436 ($OPTDET_1$, $OPTDET_2$ and $OPTDET_3$ through $OPTDET_N$) and N data estimators 442 ($DATAest_1$, $DATAest_2$ and $DATAest_3$ through $DATAest_N$). The receiver 414 may also include other components such as preamplifiers, post compensation, optical couplers, trans-impedance amplifiers, limiting amplifiers and radio frequency (RF) filters.

The N receive filters 434 filter the incoming optical signal into N channels from the optical link 18 and pass N channel filtered signals to the optical detectors 436. The receive filters 434 may be implemented as N separate devices or as a single device having multiple passbands. They may be constructed with interleavers, arrayed wavelength grating (AWG), fiber Bragg grating (FBG), thin-film filter (TFF) devices or other optical filtering devices. The transmit filters 426 ($TXF_1$, $TXF_2$ and $TXF_3$ through $TXF_N$) and the receive filters 434 ($RXF_1$, $RXF_2$ and $RXF_3$ through $RXF_N$) are pre-selected as filter sets 444 designated as $SetF_1$, $SetF_2$ and $SetF_3$ through $SetF_N$.

The optical detectors 436 convert the N modulated optical signals into N electrical signals and pass the modulated electrical signals to the data estimators 442. The optical detectors 436 may be photodiodes or avalanche photodiodes. The data estimators 442 may include clock and carrier recovery circuits, demodulators, data recovery circuits, and forward error correction (FEC) for providing their best estimates of the data that was transmitted in each of the N channels.

Figure 11:
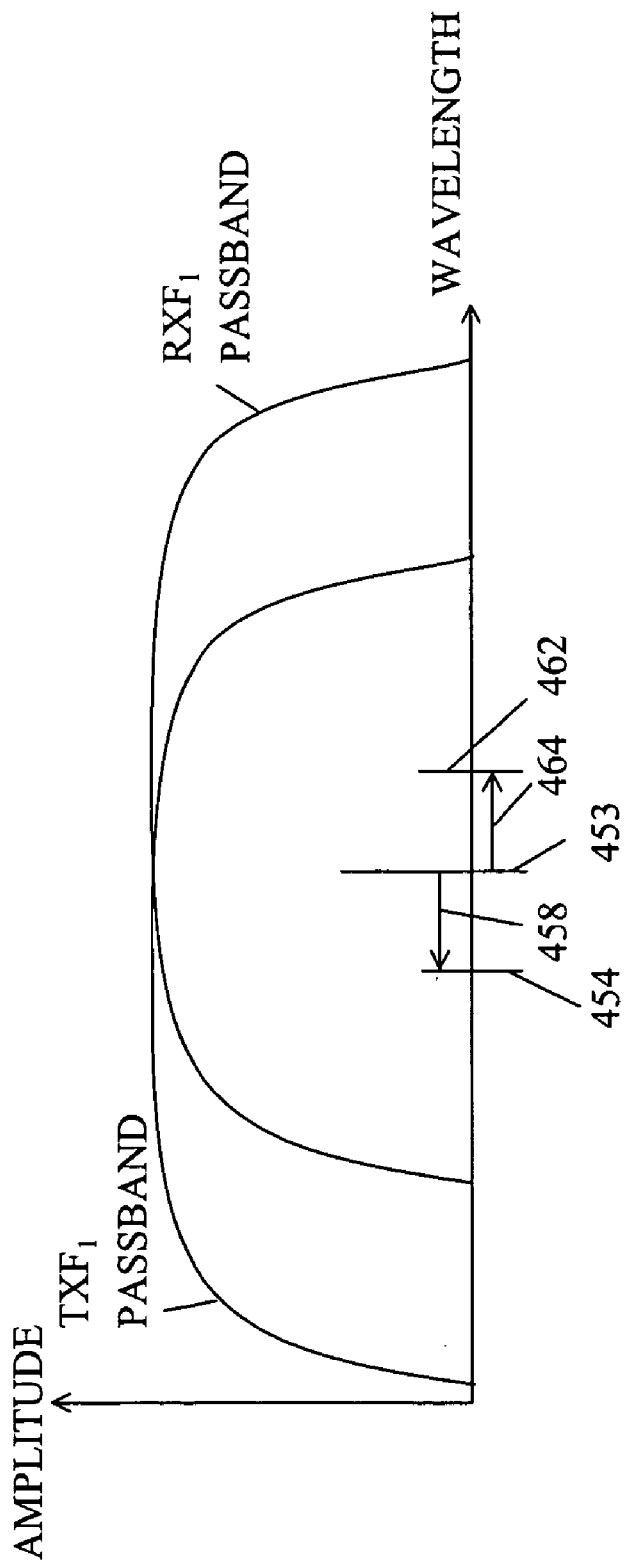
FIG. 11 is a wavelength chart for the system of FIG. 10.

FIG. 11 is an amplitude versus wavelength chart for the system 400 illustrating the passbands for the transmit and receive filters 426 and 434 in the filter sets 444. The first wavelength channel of the N-channel system 400 having filter set $SetF_1$ is arbitrarily selected as an example. All N wavelength channels operate in a similar fashion. Wavelength passbands for the transmit filter $TXF_1$ and the receiver filter $RXF_1$ of the filter set $SetF_1$ are shown with respect to a specified center wavelength 453 of the first channel of the system 400.

The transmit and receive filters 426 and 434 are designed and manufactured to match the specified center wavelength 453 of the first channel of the system 400.

However, manufacturing tolerances result in unintentional wavelength errors or offsets with respect to the specified center wavelength 453 and with respect to each other. These wavelength errors have the effect of increasing the bit error rate of the system 400. In order to mitigate this effect, the filter sets 444 are pre-selected for the transmit and receive filters 426 and 434.

The filter set $SetF_1$ includes the transmit filter $TXF_1$ having a center wavelength 454 and the receive filter $RXF_1$ having a center wavelength 462. The transmit and receive center wavelengths 454 and 462 have transmit and receive wavelength offsets 458 and 464 with respect to the specified center wavelength 453. The transmit and receive filters $TXF_1$ and $RXF_1$ are selected in the filter set $SetF_1$ so that the receive filter offset 464 is equal to the transmit filter offset 458 but has the opposite sign with respect to 30 the specified center wavelength 453. This has the rather unexpected result that the minimum BER is obtained by placing the center wavelengths 454 and 462 at equal wavelength differences on opposite sides of the channel center wavelength 453.

The transmit filters 426 may be individual devices or a single device having multiple passbands. Likewise the receive filters 434 may be individual devices or a single device having multiple passbands. Where a single filter device having multiple passbands is used, each of the filter sets 444 would include that filter device. For a single device transmit filter 426 and individual device receive filters 434, the filter sets $SetF_1$, $SetF_2$ and $SetF_3$ through $SetF_N$ would have the individual device receive filters $RXF_1$, $RXF_2$ and $RXF_3$ through $RXF_N$ selected for the multiple passbands of the single device transmit filter 426, and vice versa.

Figure 12:
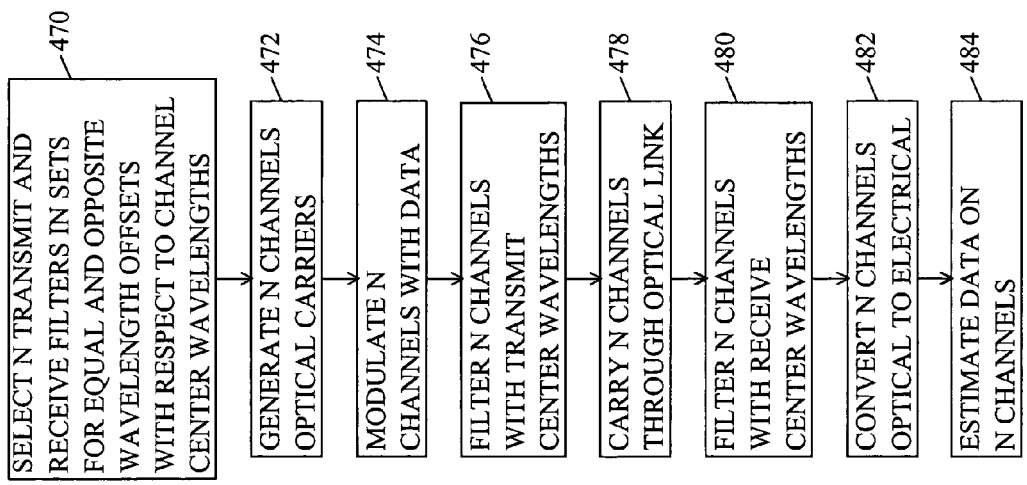
FIG. 12 is a flow chart of a method for the optical transmission system of FIG. 10.

FIG. 12 is a flow chart of the fourth embodiment of a method of the present invention for transmitting N-channel wavelength division multiplexing (WDM) or dense wavelength division multiplexing (DWDM) optical signals. In a step 470 the filter sets 444 are selected for equal and opposite wavelength offset errors 458 and 464 with respect to the design center wavelengths 453 of the channels. In steps 472 and 474 N optical signals are generated by light sources and modulated with data at a transmitter. In a step 476 the N channels are filtered by the transmit filters of the filter sets 444 for an channel optical signal onto an optical link.

The N channel optical signal is carried by the optical link in a step 478 from the transmitter to a receiver. In a step 480 the N channels are demultiplexed and filtered with receive filters of the filter sets 444. In a step 482 the filtered N optical signals are converted to N electrical signals. In a step 484 the data on the N electrical signals is estimated.

A performance measure termed "Q" may be used for measuring system performance where bit error rate (BER) relates with Q by the complementary error function BER=0.5erfc(Q/1.414...). A Q penalty is a measure for degradation of system performance. For a given Q penalty, the accuracy required for the opposite match of the transmit and receive wavelength offsets with respect to carrier wavelength for the systems 100, 200 and 300, or the channel center wavelength for the system 400, is determined by the data rate and the optical bandwidth limiting that is used by the systems. In most cases, the BER penalty or Q penalty is acceptable when the match of the wavelength offsets has a frequency error of less than a few percent of the data rate. For example, for a data rate of 43 Gbit/s rate, an acceptable frequency error may be about 2 GHz.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An optical transmission system, comprising:
   an optical transmitter including a light generator for generating a transmit signal having a carrier wavelength and an optical transmit filter for filtering said transmit signal at a transmit wavelength offset with respect to said carrier wavelength; and
   an optical receiver for receiving said filtered transmit signal through a link, the receiver including an optical receive filter for filtering said received signal at a receive wavelength offset opposite and equal said transmit wavelength offset with respect to said carrier wavelength.

2. The system of claim 1, wherein:
   the optical receiver further includes an error estimator for estimating an error rate for said filtered received signal; and
   the receive filter uses said estimated error rate for tuning said receive wavelength offset for minimizing said estimated error rate.

3. The system of claim 1, wherein:
   the optical receiver further includes an error estimator for estimating an error rate for said filtered received signal; and
   the transmit filter uses feedback from said estimated error rate coupled through a backchannel for tuning said transmit wavelength offset for minimizing said estimated error rate.

4. The system of claim 1, wherein:
   the optical receiver further includes an error estimator for estimating an error rate for said filtered received signal; and
   the light generator uses feedback from said estimated error rate coupled through a backchannel for tuning said carrier wavelength for minimizing said estimated error rate.

5. An optical transmission system, comprising:
   a filter set having an optical transmit filter and an optical receive filter, wherein a first of the transmit and receive filter has a first wavelength offset with respect to a channel center wavelength defined in a system specification for the system and a second of the transmit and receive filter has a second wavelength offset opposite and equal of said first wavelength offset with respect to said channel center wavelength;
   an optical transmitter having said transmit filter for filtering an optical transmit signal; and
   an optical receiver for receiving said filtered transmit signal through a link, the receiver including said receive filter for filtering said received signal.

6. A method in an optical transmission system, comprising:
   generating an optical transmit signal having a carrier wavelength;
   filtering said transmit signal at a transmit wavelength offset with respect to said carrier wavelength;
   receiving said filtered transmit signal through a link; and filtering said received signal at a receive wavelength offset with respect to said carrier wavelength opposite and equal said transmit wavelength offset.

7. The method of claim 6, further comprising:
estimating an error rate for said filtered received signal; and
tuning said receive wavelength offset according to estimated error rate for minimizing said estimated error rate.

8. The method of claim 6, further comprising:
estimating an error rate for said filtered received signal;
receiving feedback for said estimated error rate through a backchannel; and
tuning said transmit wavelength offset according to said feedback for minimizing said estimated error rate.

9. The method of claim 6, further comprising:
estimating an error rate for said filtered received signal;
receiving feedback for said estimated error rate through a backchannel; and
tuning said carrier wavelength according to said feedback for minimizing said estimated error rate.

10. A method in an optical transmission system, comprising:
selecting an optical transmit filter and an optical receive filter as a filter set, wherein a first of the transmit and receive filter has a first wavelength offset with respect to a channel center wavelength defined in a system specification for the system and a second of the transmit and receive filter has a second wavelength offset opposite and equal of said first wavelength offset with respect to said channel center wavelength;
filtering a transmit signal with said transmit filter;
receiving said filtered transmit signal through a link; and
filtering said received signal with said receive filter.

11. An optical transmission system, comprising:
an optical transmitter including a light generator for generating a transmit signal having a carrier center wavelength and an optical transmit filter for filtering said transmit signal at a transmit center wavelength offset with respect to said carrier center wavelength; and
an optical receiver for receiving said filtered transmit signal through a link, the receiver including an optical receive filter for filtering said received signal at a receive center wavelength offset opposite and equal said transmit center wavelength offset with respect to said carrier center wavelength.

12. The system of claim 11, wherein:
the optical receiver further includes an error estimator for estimating an error rate for said filtered received signal; and
the receive filter uses said estimated error rate for tuning said receive center wavelength offset for minimizing said estimated error rate.

13. The system of claim 11, wherein:
the optical receiver further includes an error estimator for estimating an error rate for said filtered received signal; and
the transmit filter uses feedback from said estimated error rate coupled through a backchannel for tuning said transmit center wavelength offset for minimizing said estimated error rate.

14. The system of claim 11, wherein:
the optical receiver further includes an error estimator for estimating an error rate for said filtered received signal; and
the light generator uses feedback from said estimated error rate coupled through a backchannel for tuning said carrier center wavelength for minimizing said estimated error rate.

* * * * *